United States Patent [19]
Moore et al.

[11] 3,977,054
[45] Aug. 31, 1976

[54] STRAP FITTING FOR AUTOMOBILE INTERIOR AND OTHER USES

[75] Inventors: Ronald D. Moore, Grosse Pointe; Everett L. Bethel, Sterling Heights, both of Mich.

[73] Assignee: Chivas Products Ltd., Warren, Mich.

[22] Filed: Jan. 30, 1976

[21] Appl. No.: 653,668

Related U.S. Application Data

[63] Continuation-in-part of Ser. No. 538,538, Jan. 6, 1975.

[52] U.S. Cl.................... 24/265 R; 16/110 R; 190/57
[51] Int. Cl.²................ A47B 95/02; A45C 13/26
[58] Field of Search........... 190/57; 52/716, 717; 296/135; 16/110 R, 125; 224/45 P, 45 Q, 45 T; 24/73 FT, 73 PM, 265 R

[56] References Cited
UNITED STATES PATENTS

| | | | |
|---|---|---|---|
| 1,125,280 | 1/1915 | Felsberg | 190/57 |
| 1,667,567 | 4/1928 | Shwayder | 190/57 |
| 1,792,718 | 2/1931 | Stoll | 24/31 L |
| 2,695,691 | 11/1954 | Finkelstein | 190/57 |
| 3,023,868 | 3/1962 | Koffler | 190/57 |
| 3,115,227 | 12/1963 | Shanok et al. | 190/57 |
| 3,736,621 | 6/1973 | Szabo | 190/57 X |
| 3,737,944 | 6/1973 | Szabo et al. | 16/110 R |

FOREIGN PATENTS OR APPLICATIONS
1,032,176   3/1953   France ................ 190/57

*Primary Examiner*—Donald A. Griffin
*Attorney, Agent, or Firm*—Harness, Dickey & Pierce

[57] ABSTRACT

This invention pertains to a novel ornamental strap or handle particularly suited for use as door pulls, assist straps, or the like in automobiles or the like. The invention provides a strap having a luxurious cushioned feel when grasped by an individual, a decorative appearance and strength and rigidity to accomplish its intended purpose. The strap of the present invention includes a base strip with a cushion strip of generous thickness disposed on at least one side thereof and a suitable cover strip wrapped securely around the base and cushion members. A trim strip is disposed over and conceals the longitudinal edges of the cover strip and is secured thereto by any suitable means such as dielectric heat fusion. Means are also provided to cushion the hard feel of the lateral edges of the base member. Thus, a decorative strap is provided which has a smooth wrinkle-free aesthetically pleasing contour and creates a soft plush luxurious feeling when engaged by the hand.

29 Claims, 20 Drawing Figures

STRAP FITTING FOR AUTOMOBILE INTERIOR AND OTHER USES

BACKGROUND AND SUMMARY OF THE INVENTION

This application is a continuation-in-part of our previously filed copending application entitled "Strap Fitting For Automobile Interior And Other Uses", Ser. No. 538,538, filed Jan. 6, 1975, which is assigned to the same assignee as the present application.

Straps of various constructions are employed on a wide variety of articles for various purposes, ranging from purely functional to primarily ornamental. In particular, with the current emphasis for removal of hard protruding objects in automobile passenger compartments, straps have increasingly been utilized for various purposes; such as door pulls replacing the handles of the older models. Also, straps have long been installed in various locations in automobile interiors, both as a decorative ornamentation accenting the interior design and as a functional article providing assistance to the occupants thereof, such as for ingress and egress. In such applications, it is extremely desirable to provide a strap which imparts a soft, cushioned feeling of luxury to the user thereof, while still having the strength to perform its intended purpose. Further, as such straps are also provided as interior accent pieces, they must possess an attractive appearance, thus requiring them to present a smooth, wrinkle-free exterior surface and the ability to retain such an appearance with use. These attributes become increasingly important when such straps are to be used in automobile interiors of the luxury car class. A further consideration present in any high volume production item as is contemplated for the present invention is the necessity to minimize the cost of manufacturing such articles. Accordingly, various designs have been previously developed in an attempt to provide a strap which achieves these objectives, none of which have been totally successful.

One technique employed to accomplish these objectives was to encase a steel rod or band in a plastic covering. The steel provided the desired strength to the strap arrangement and also could be preshaped to any desired configuration. The plastic could then be molded around this steel core with any suitable decorative surface formed thereon. While this type of construction incorporated the desired characteristics of strength and low manufacturing costs, it presented a hard, unyielding feel when grasped. This hard feel is particularly undesirable when such straps are fitted to a luxury class automobile. Further, such constructions are prone to cracking of the plastic casing with age and adverse temperature extremes encountered in automobiles.

In another type of construction, a resilient material surrounds a metal core. This assembly is then covered with a suitable material, the edges of which are overlapped and secured to each other. Such constructions presented the desirable soft feel, but the overlapped seam of the outer covering either detracted from its aesthetic appearance if located on the outer face thereof or presented a hard ridge detracting from the otherwise soft feel if located on the backside of the strap. Further, when a longitudinal contoured strap is desired, a wrinkling of the outer covering is often encountered at the inside of the curve when the contouring operation is performed after assembly of the strap. If the base strip is performed to the desired shape before assembly, greater tension must be exerted on the cover strip, causing a collapsing of the cushioning material, thus lessening the soft feel. Such wrinkling detracts greatly from the ornamental, decorative appearance of the strap.

The present invention provides a solution to these previously encountered problems through the combination of a base strip for strength and which may be formed to any desired longitudinal contour; a cushioning member to create the desired soft feel when engaged by the hand, and an outer covering applied in such a manner as to provide an elegant, smooth, wrinkle-free surface while maintaining the resiliency provided by the cushioning member. Further, the present invention is both economical to manufacture and may include a wide variety of outer coverings and trim strips, thus allowing it to be easily adapted to blend with or accentuate a wide variety of decors.

DESCRIPTION OF THE PREFERRED EMBODIMENTS

Figure 1:
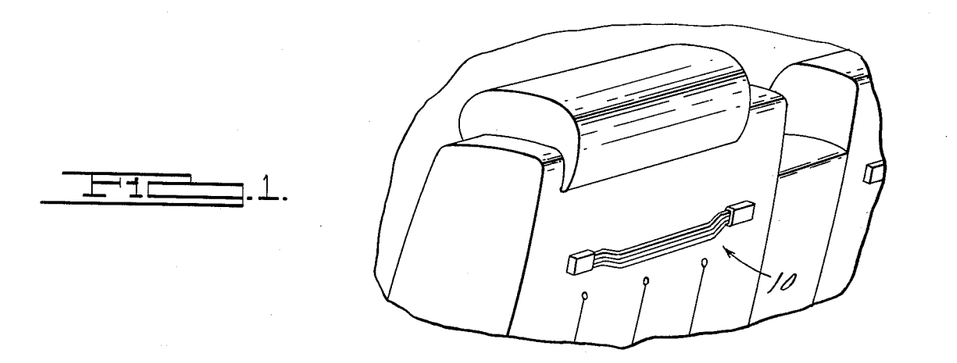
FIG. 1 is a view of a portion of an automobile interior illustrating the present inention as applied to the rear portion of a front automobile seat.
Figure 2:
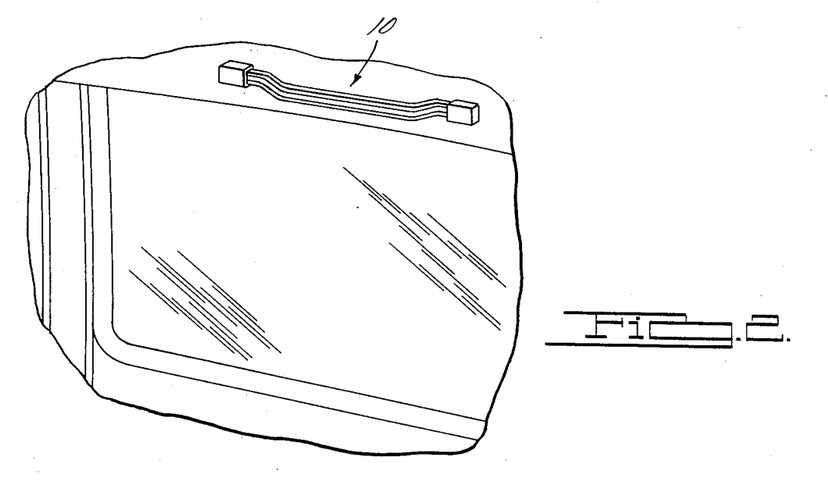
FIG. 2 shows a strap of the present invention applied to an automobile interior above a rear window for use as a hand assist for passenger egress from a rear seat.

Reference is now made to the drawings in which FIGS. 1 and 2 illustrate the application of a strap of the present invention at 10 to an automobile interior. FIG. 1 shows an embodiment of the present invention 10 installed on the back of the front seat of an automobile. FIG. 2 shows a similar embodiment of the present invention 10 installed on the roof portion above the rear window in an automobile interior. As may be readily seen from these figures, the straps are not only functional in providing assistance to a passenger in entry or exit from the vehicle but are an integral part of the interior decor, making a distinctive contribution to the overall impression of a richly appointed automobile interior.

Figure 3:
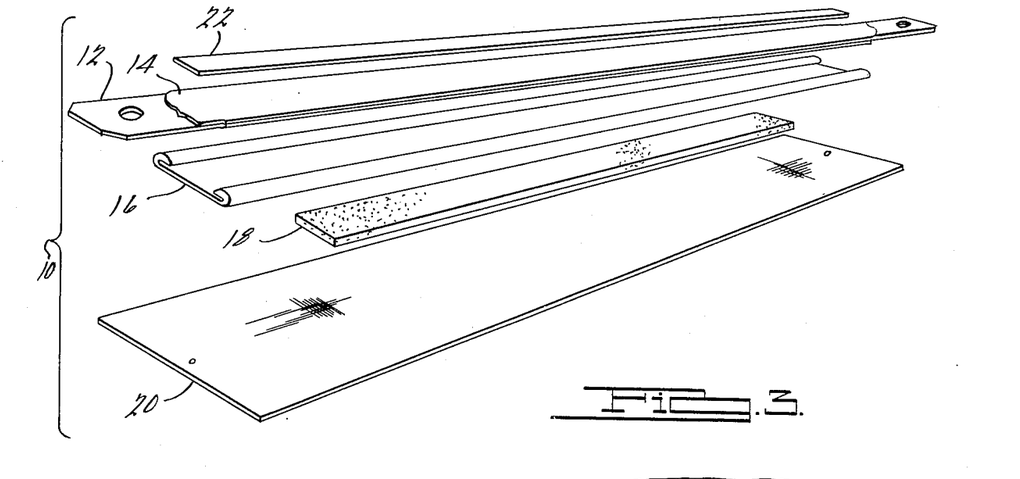
FIG. 3 is an exploded perspective view of the present invention illustrating the individual components.

The general construction of the present invention is best seen in the exploded view of FIG. 3 wherein strap 10 is comprised of a base strip 12 having a thin layer of a thermally activatable composition 14 on at least one side thereof; an adapter strip 16 which surrounds the lateral edges and at least one side of the base strip; a cushion member 18 having a generally rectangular transverse cross section; a facing strip 20 having a face coating of vinyl or other thermally activatable composition which wraps around and secures the base strip, adapter strip, and cushion member; and a trim strip 22 disposed over and concealing the opposed longitudinal edges of face strip 20. The trim strip 22, face strip 20, and thermally activatable composition 14 are secured by dielectric heat fushion. It should be noted that while dielectric heat fushion is the preferred bonding means, any suitable adhesive may be substituted therefor, in which case the layer of thermally activatable composition 14 on base strip 12 may be omitted.

One embodiment of the luxury-type fitting of the invention, as illustrated and generally designated 24 in FIGS. 4 and 5, comprises a dielectrically fused lamination of strip components including an elongated fabric-backed facing strip or sheet 26, (edge-lapped portions of which are later described), which strip is externally face-coated with a dielectrically activatable thermoplastic coating composition, preferably, as appears from the above, a vinyl formulation. This is colored and/or textured to match, blend or contrast with the upholstery of the inner panel P of an automobile door or other interior finish surface. In applications other than to an automotive fitting, material, coloration and texture will be appropriate to the desired purpose.

The composition of the plastic facing (and this also applies to other vinyl or equivalent plastic components of the product) is such that it dielectrically fuses and bonds with the material of any other resinous component, typically under radio frequency electric current of the order of 27-¼ megacycles per second. The resultant extreme inter-polar molecular activity of the facing composition of strip 12 and other like plastic components produces a rapid and intimate bonding fushion of all thereof which engage another related type surface, including the trim strip and plastic adhesive components later referred to. The facing vinyl permeates its fabric backing and bonds integrally with other such parts. It is to be understood that this thermal fushion is performed only after all the components of the embodiment 24 have been completely assembled in place and held together, as in an appropriate heating form, press or fixture (not shown) which is electrically energized at the indicated frequency.

Figure 8:
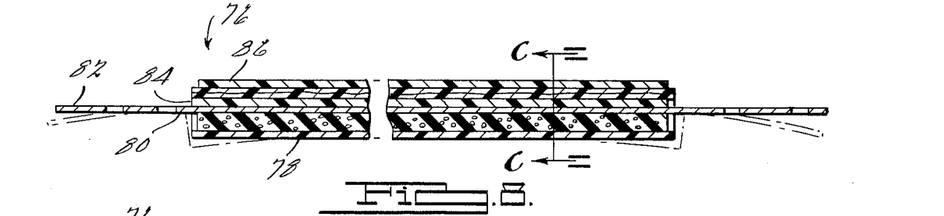
FIG. 8 is a sectional view, partially broken away and generally similar to FIG. 4 of an alternative early form of the strap fitting, being in vertical longitudinal cross section in a plane central of the strap, this view showing laminated components including a seam-concealing trim strip, a steel base strip, a foam cushion strip, a wrap-around facing strip or sheet, and also an extruded plastic adapter strip which is absent as such, in the embodiments of FIGS. 5 and 6, but has an equivalent in the FIG. 7 embodiment.

The strap 24 comprises an elongated and relatively thick pad or cushion strip 28, shown as being an extruded or otherwise molded section of vinyl, rubber or polyurethane foam and substantially coextensive in length with a main body portion of the fitting as shown in FIG. 8.

Pad or cushion 28 is sectionally shaped (FIG. 5) to provide a transversely elongated undercut groove or slot 30 which bottoms along a major portion of the transverse width of a main body portion 32 of the pad and opens longitudinally at the latter's ends; and the side edges of undercut groove 30 are defined by the inturned flange portion 34 of two like shoulders 36 integral with the pad body 32.

A second essential component of the strap 24 is an elongated flexible steel stabilizing base strip 38 whose transverse width is only slightly (if at all) less than that of the undercut groove 30. Strip 38 is precoated on its surface which will face opposite the pad or cushion body 32 with an appropriate thermally activated or energizable plastisol adhesive composition 40, and easy access of steel strip 38 to the groove 30 is had by first bending out and then releasing the pad shoulders 36, thus properly locating and confining base strip 38.

Figure 4:
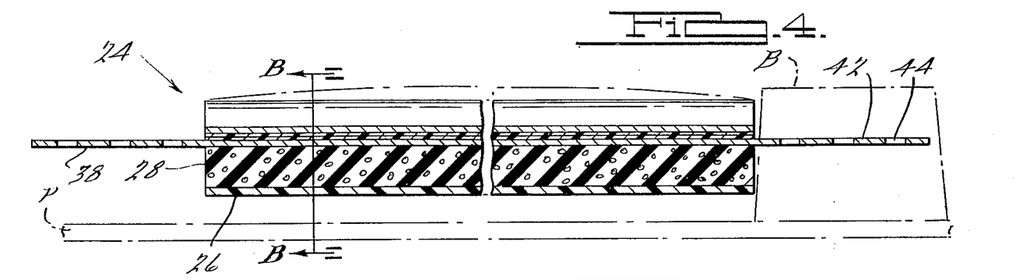
FIG. 4 is a view in longitudinal center cross section, partially broken away and on a line corresponding to line A—A of FIG. 5, of one of the preferred embodiments of the cushioned strap construction in a rabbeted-seam type, the view showing the relationship of the strap to an upholstered automotive interior panel which appears in dot-dash line.

Typically, for the pull strap use contemplated by the invention, the steel component 38 has a central body midportion which is substantially coextensive in its own length with the cushion 28, which body portion is provided at opposite ends with conventional reduced width tabs 42, as shown in FIG. 4. These are apertured at 44 for mounting the strap 24 to molded plastic bracket pieces B, as by bolt or stud means. The strap member is fixedly attached to the inner door panel or other mounting surface through the agency of these bracket provisions.

The fabric-backed and vinyl-coated facing strip or sheet 26 referred to above is applied reasonably tightly around the base and cushion strip subassembly, being drawn snugly about the rounded cushion shoulders 36; and the edges of strip 26 are substantially overlapped flatwise on one another along a relatively wide central seam zone. Said edges are each rabbeted and lapmated at 46 along their relatively wide extreme outer portions to afford a resultant flat-lapped seam or joint which is, as best shown in FIG. 5, of the same overall thickness as the remaining unrabbeted body of the facing strip 26. Facing strip 26 is tensioned both longitudinally and laterally as it is wrapped about the base and cushion strip subassembly so as to insure an absence of wrinkles on the outer surface thereof.

With said wrapped strip under tension, a final ornamental trim strip 48 is laid in place along and over the seamed joint zone, wholly covering the latter and being centered between the wrapped cushion pad shoulders 36. Strip 48 may be, for example, a relatively thin steel length ornamentally finished on its exposed surface, as typically by anodizing; or it may be a non-metallic length of resinimpregnated body cloth or the like, of the sort later referred to. Its length equals that of cushion 28 and facing 26. A length of a plastic composiion such as Mylar is also contemplated.

Following this, the application of dielectric fusing heat at the previously mentioned high frequency completes the union of parts. The highly thermo-conductive quality of the steel strip 38, of course, promotes a fast and uniform distribution of dielectric heat to the non-metallic parts; such parts include the plastisol upper coating 40 of strip 38 and, as desired, another such coating 40 on its opposite side. It should also be noted that when a metal trim strip is utilized, it must also have a plastisol coating applied to its lower surface to be bonded to the facing strip by dielectric heat fushion.

Figure 5:
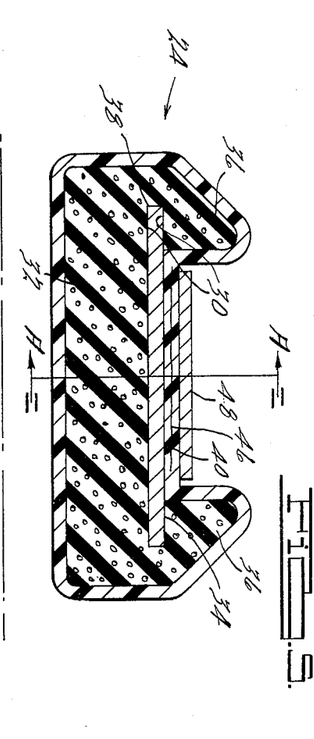
FIG. 5 is an enlarged scale view of this construction in transverse vertical cross section plane along line B—B of FIG. 4.
Figure 6:
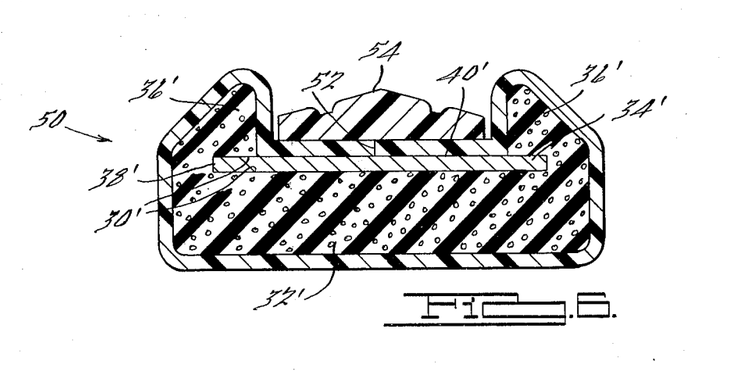
FIG. 6 is a sectional view similar to FIG. 5 of a closely related alternative and preferred embodiment of the strap construction, in which an edge-butted facing strip seam is employed.

The embodiment of the improved strap fixture appearing in FIG. 6 and generally designated 50, is very similar to that of FIGS. 4 and 5, to the extent that corresponding numerals, primed, are employed to designate corresponding parts and further description thereof is dispensed with.

Strap 50, for one thing, embodies an edge-butted relationship at 52 of its seamed edge areas, rather than the rabbeted and overlapped seaming zones 46 of the first form. A constant thickness joint then exists across the portion of the width of the steel base strip 38' which engates said seamed joint. Moreover, in this case, the seam is concealed by a length of a Mylar extrusion, specially designated 54, having an attractive finish, for example, a wood-grained one bordered by simulated chrome strips; and many other types of trim stripping are, of course available in substitution for the ornamental metal trim of FIGS. 4 and 5. Furthermore, an appropriate resin-impregnated body cloth or a fabric-backed vinyl sheeting are optional trim strip substitutes in any embodiment of the invention. As will appear from FIG. 7, the foam pad or cushion strip may be supplemented by an additional yieldable strip component which affords not only means for laterally locating and confining said cushion, but also similarly receives and retains the flexible steel base strip.

Figure 7:
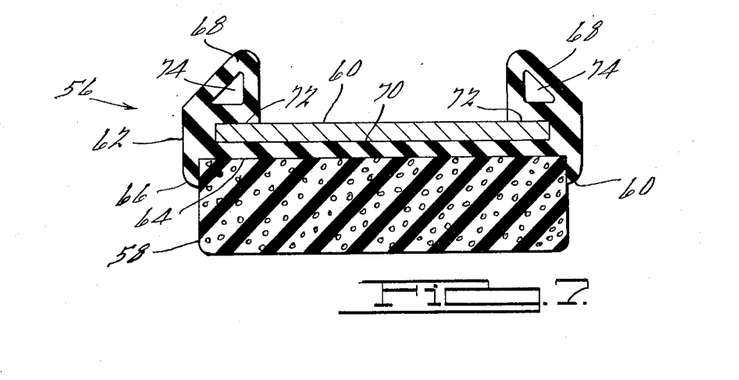
FIG. 7 is a similar sectional view, of a rather skeletal nature, showing an optional unwrapped subassembly of a foam cushion strip, a base strip and a base and cusion-locating and adapter component, the latter being undercut grooved for the purpose and being in this case a molting or extrusion of a relatively solid material such as rubber or yieldable plastic having internal passaging therealong to impart a resilient compressability thereto.

Thus, FIG. 7 illustrates a subassembly 56 of a foam cushion pad 58, a steel stabilizing and base strip 60 and an intermediate adapter strip length 62 of solid section, for example, an extrusion or otherwise molded section of rubber or equivalent resilient elastomer. This adapter strip has an elongated wide bottom groove 64 defined by parallel side lips 66 between which the pad 58 is snugly received.

The strip 62 has integrally molded shoulders 68 contoured similarly to the shoulders 36 and 36' of the prior forms 24 and 50, and between said shoulders an undercut groove 70 is formed in the strip. This is in part defined by inwardly extending lips 72 of the shoulders, which lips resiliently retain base strip 60 from above. As in the case of the straps 24 and 50, the shoulders 68 are to be rolled back to expose groove 70 to receive the strip 60, then released onto the latter above the side undercuts of the cushion groove.

For the purpose of enhancing its resilient compressibility, the adapter strip 62 is formed to provide parallel elongated air channels 74 in and along each of its rounded shoulders 68; and the subassembly unit 56 will have a vinyl or equivalent coated facing sheet (not shown) snugly wound about it under tension, then dielectrically bonded, seamed and finish-ornamented to conceal the seaming, exactly as described above in the case of the strap structures 24 and 50.

Figure 9:
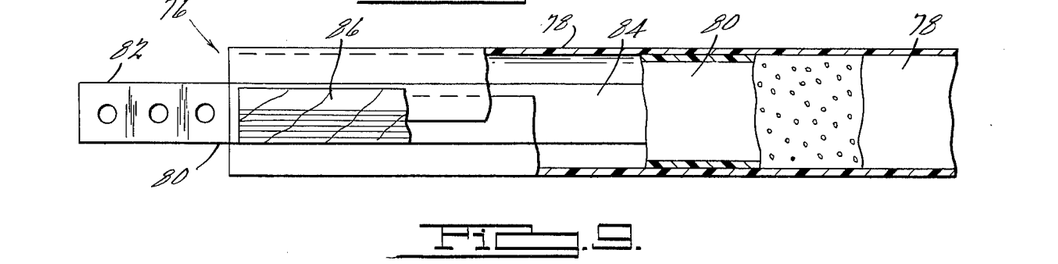
FIG. 9 is a fragmentary plan view of the strap of FIG. 8, being partially broken away along its length to show the various individual plastic and metal components.
Figure 10:
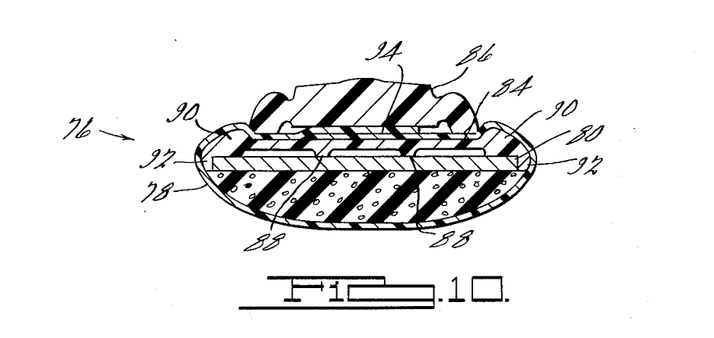
FIG. 10 is an enlarged scale view in transverse section on line C—C of FIG. 8.

Pursuant to one of the earlier developments of the invention the strap fitting, as illustrated in FIGS. 8, 9 and 10 and generally designated 76, is characterized by a resin-coated facing strip 78, a steel base strip 80 having reduced width mounting extensions 82, and adapter extrusion strip 84 (generally similar to the adapter 62 of FIG. 7) and an ornamentation strip 86, all have the characteristics previously described, hence need no further amplification. In this case the adapter 84 has a flat and relatively wide body portion which carries on its lower surface a pair of integral ribs 88 for stable intermediate engagement with steel strip 80 upon opposite sides of these ribs; and the adapter's side edges carry rounded shoulder portions 90. These have stable flatwise engagement with base strip 80 along the latter's edges, and they terminate in integral bottom lips 92. Said lips are spaced from one another but a trifle more than the width of the strip 80, so as to mate over the edges of the latter, as illustrated in FIG. 10, and thus assist in registering and laterally confining the base and cushion parts against lateral shift. A heat activatable bonding agent may be employed, if desired. The edges of facing strip are shown as having a plain seam overlap at 94.

Figure 11:
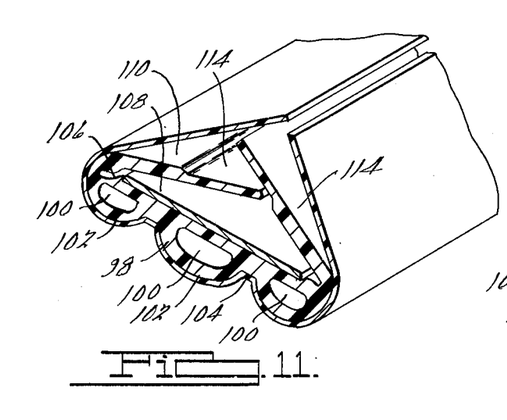
FIG. 11 is a fragmentary perspective and transversely sectioned view showing partially assembled components of another earlier rabbet-seamed strap construction which also affords an air-cushioned feel to the grip of the occupant.
Figure 12:
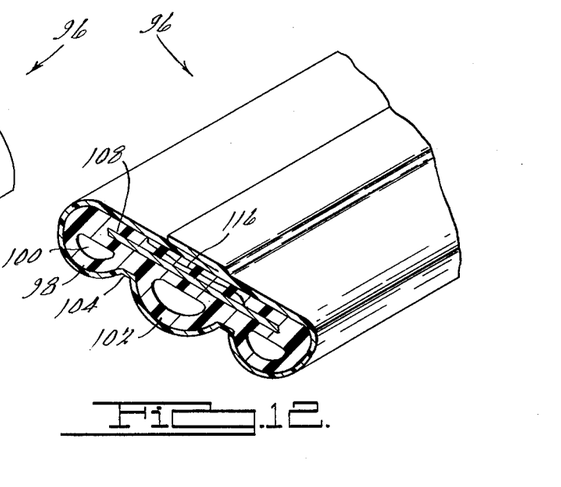
FIG. 12 is a similar fragmentary perspective and sectioned view showing the article of FIG. 11 in a fully bonded and completed form.

In the further alternative construction of FIGS. 11 and 12, specially designated by the reference numeral 96, a vinyl or other plastic extrusion 98 is sectioned to form three elongated and separate parallel cavities or air passages 100 which are coextensive in length with the extrusion. These are defined by separate external and convexly rounded hollow bead-like formations 102. Thus, a resilient cushioning "soft-feel" action is imparted to said piece along the lateral surface thereof at which the finished strap fitting 96 of this form is felt by the fingers of the user.

Prior to being wrapped about the extrusion 98 the plastic-backed fabric facing sheet or strip has said extrusion secured in place thereon by parallel lines of machine stitching 104 between the hollow-air cushioning formations 102. Thus, a two-part subassembly of cushioned strip members may be prefabricated for later mass completion. The completed strap fitting of this form appears partially in FIG. 12.

On its surface opposite the convexly molded surface the strip 98 carries a pair of parallel integral ribs 106 between which the steel stabilizing base strip 108 is registered and laterally held in place.

The molded plastic part above referred to further carries a pair of generally similar wide longitudinally extending parallel legs or flanges 110, 112 integral with and along its sides. Said flanges are molded along their extreme outer zones to afford reduced thickness, oppositely rabbeted lap extensions 114, which are so proportioned that, after the flanges 110, 112 have been bent inwardly toward one another and down onto the steel strip 108, a resultant flat-lapped joint zone at 116 is, as best shown in FIG. 12, of the same overall thickness as the remainder of the flange portions. In this respect, the sectioning of the extrusion flanges resembles that of the rabbeted facing edge joint 46 of the embodiment of FIGS. 5 and 6. High frequency dielectric fusing heat completes the union of parts.

Figure 13:
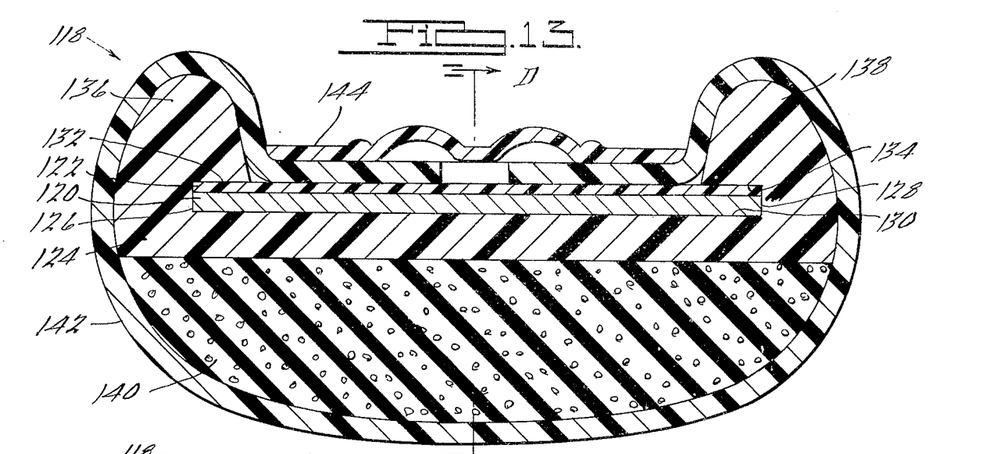
FIG. 13 is a transverse cross sectional view of another embodiment of the present invention.

A transverse cross sectional view of another embodiment of the present invention is shown in FIG. 13 at 118. A base strip 120 has a relatively thin layer of a thermally activatable material 122 disposed on one side thereof and an adapter strip 124 surrounding the lateral edges and lower surface thereof. Adapter strip 124 is similar to adapter strip 62 of FIG. 7 having an undercut groove or slot defined by sidewalls 126 and 128 and bottom 130 and top wall sections 132, 134 which extend longitudinally its entire length. Extending above each of top wall sections 132 and 134 are shoulder portions 136 and 138. A cushion member 140 engages the lower surface of adapter strip 124 and is held thereto by an outer face strip 142 which is wrapped snugly around cushion member 140, adapter strip 124, and base strip 120. Face strip 142 is tensioned both transversely and longitudinally to insure a wrinkle-free strap. The transverse width of face strip 142 is sufficient to wrap completely around the assembly with the longitudinal edges thereof engaging thermally activatable material 122 in an opposed, slightly spaced-apart relationship. A trim strip 144 is then disposed over the spaced-apart longitudinal edges of face strip 142 in such a manner as to fully conceal them. Trim strip 144, face strip 142, and thermally activatable material 122 are all secured together by any suitable means; for example, by dielectric heat fusion. Trim strip 144 may be of any suitable material, such as a decorative fabric, vinyl composition, plastic or like material, or even of metal and is of such a width as to substantially cover the recessed area between shoulder portions 136 and 138. In FIG. 13, trim strip 144 is a vinyl or plastic composition and has a decorative similated French stitch imprinted thereon by a die during the dielectric heat fushion of the components.

Figures 14, 15:
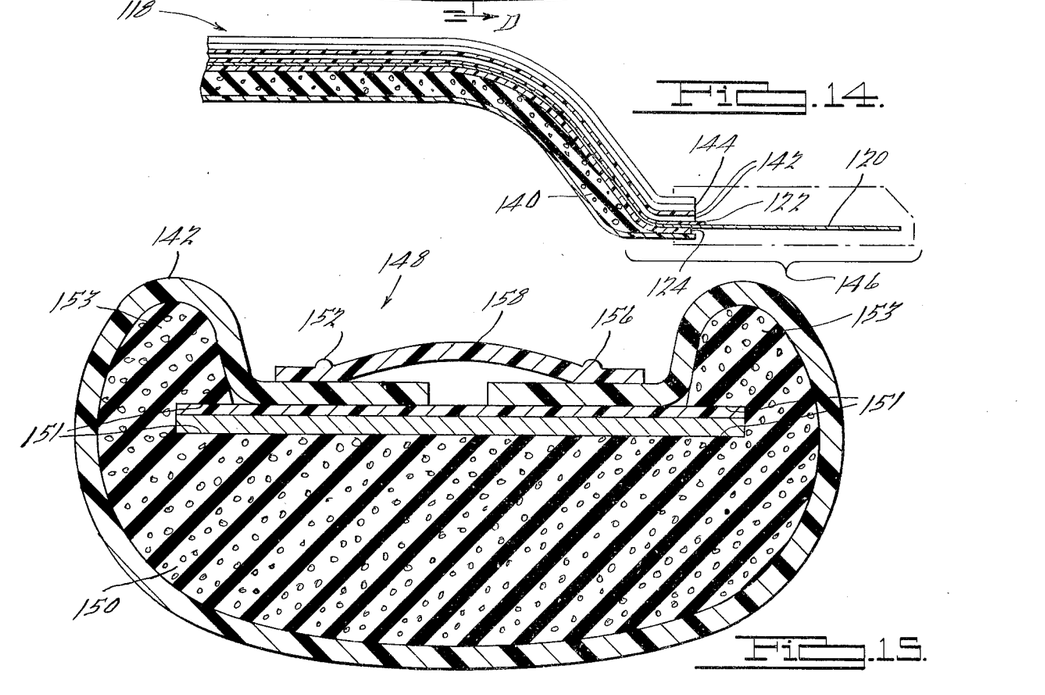
FIG. 14 is a longitudinal cross sectional view of a portion of the embodiment of the present invention of FIG. 13 taken along line D—D.
FIG. 15 is a transverse cross sectional view of yet another embodiment of the present invention.

FIG. 14 shows a longitudinal cross section of one end portion of the strap 118 of FIG. 13 from which the relative lengths of the various components are readily apparent. Face strip 142, trim strip 144, and adapter strip 124 are all substantially of equal length whereas base strip 120 extends beyond the ends thereof so as to provide tabs for mounting of the strap on a desired article. Cushion member 140 is substantially shorter than face strip 142 so as to avoid unnecessary bulk along surface 146 which will engage the article to which the strap is to be mounted. The layer of thermally activatable material 122 disposed on base strip 120 is at least coextensive with the length of face strip 142 so as to insure against loose edges from which a tear may propagate and may, if desired, cover the entire length of base strip 120. The opposite end of strap 118 is identical to that of FIG. 14.

Figure 16:
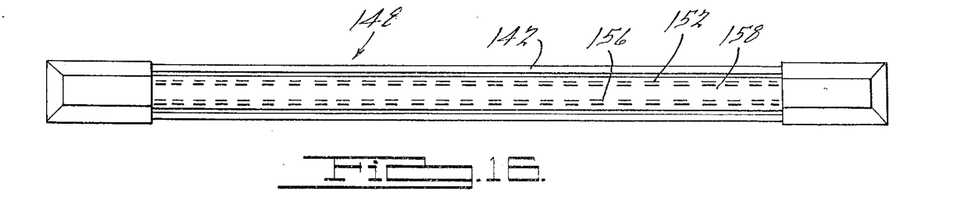
FIG. 16 is a view of the present invention as seen in an installed position.

Another embodiment of the present invention is shown in transverse cross section at 148 of FIG. 15. This embodiment is identical to that of FIG 13, save for two exceptions. Firstly, the adapter strip and cushion member of the embodiment of FIG. 15 are formed as a single integral piece. Integral adapter/cushion member 150 is identical in overall shape to the combination of adapter strip 124 and cushion member 140, having an undercut groove 151 into which the base strip is inserted and rounded shoulders 153 extending longitudinally therealong. Member 150 may be fabricated from any soft, pliable, resilient-type material such as foam rubber for example. Secondly, the trim strip 158 of FIG. 15 has two spaced apart parallel lines of simulated stitching 152 and 156 imprinted thereon. This simulated stitching is of such a nature as to create the appearance that trim strip 158 is sewn to cover strip 142, as is best seen in FIG. 16.

Another embodiment of the present invention is shown at 182 in FIG. 17 with a modified adapter strip 184 shown in an operative relationship to a base strip 185 and having a cushion member 186 below adapter strip 184, a face strip 188 wrapped around the base strip 185, adapter strip 184 and cushion member 186 and a trim strip 187 concealing the longitudinal edges of the face strip, all as previously described. Adapter strip 184 has a relatively flat upper surface portion 188 flanked on either side by raised shoulder portions 189 and 190. A relatively flat lower surface 191 has a longitudinal opening 192 coextensive with the length of adapter strip 184, which provides access to an undercut groove 194 extending transversely between shoulder portions 189 and 190 into which base strip 185 is placed. Groove 194 is longitudinally coextensive with the adapter strip and of a width and height substantially equal to that of base strip 185. Adapter strip 184 may be formed of any suitable material having a rubber-like, resilient, pliable feeling such as rubber, polypropylene, or other plastic composition for example. Undercut groove 194 will prevent relative rotation of base strip 185 and as surface 188 is continuous between shoulders 189 and 190, the need for a layer of thermally activatable material on base strip 185 is eliminated. Adapter strip 184 may be easily substituted for any of the previously described adapter strips and may further be secured to base strip 185 by any suitable adhesive should greater insurance against relative rotation be desired.

Figure 18:
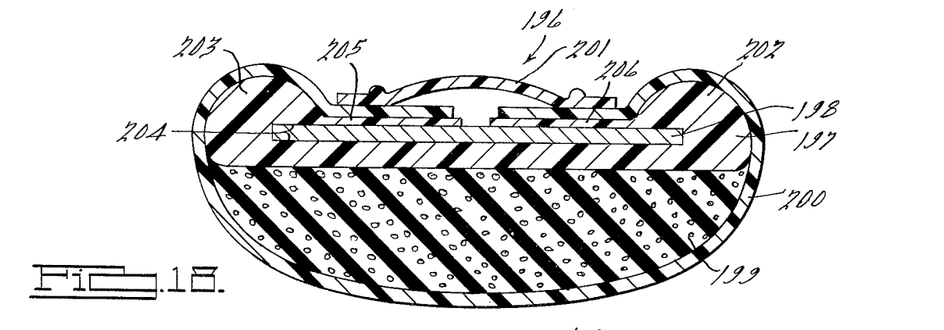
FIG. 18 is a transverse cross sectional view similar to that of FIG. 17 but showing another embodiment of an adapter strip of the present invention.

Another embodiment of the strap 196 of the present invention having yet another adapter strip 197 is shown in FIG. 18. Adapter strip 197 is shown in its operative relationship to a base strip 198, a cushion member 199, face strip 200 and trim strip 201, all as previously described. Adapter strip 197 is similar to adapter strip 124 of FIG. 13 having a pair of parallel spaced apart shoulder portions 202 and 203 and an undercut groove 204 extending therebetween all of which are longitudinally coextensive with adapter strip 197 but additionally has two members 205 and 206 extending laterally inward from each of shoulder portions 202 and 203 and meeting in an abutting or slightly spaced apart relationship, thus providing a substantially continuous surface between shoulder portions 202 and 203 and substantially enclosing undercut groove 204.

Figure 17:
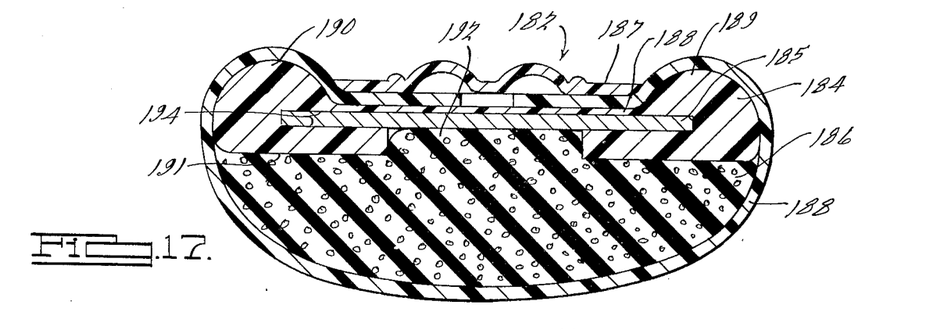
FIG. 17 is a transverse cross sectional view of a strap in accordance with the present invention showing a base strip with a modified adapter strip applied thereto.

Adapter strip 197 may be formed of like material as described for adapter strip 184 of FIG. 17, eliminates the need for a layer of thermally activatable material on the base strip, and may be substituted for any of the previously described adapter strips.

Figure 19:
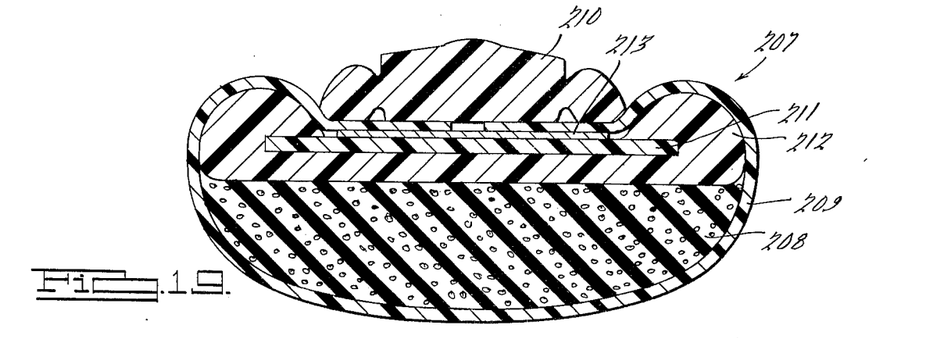
FIG. 19 is also a transverse cross sectional view of yet another embodiment of the present invention having an adapter strip and base strip of the present invention.

Still a further embodiment of the strap 207 of the present invention having a cushion member 208, face strip 209, and trim strip 210 all as previously described is shown in FIG. 19. Strap 207 further has a modified base strip 211 shown with an adapter strip 212 identical to that of adapter strip 124 of FIG. 13 installed thereon. Base strip 211 is also similar to those previously described except that it is formed of resilient, plastic composition which may be shaped to a desired longitudinal contour subsequent to assembly of the strap components. In those applications in which dielectric heat fusion is employed to seal the cover and trim strips, base strip 211 is provided with a thin layer of an electrically conductive material 213 along its upper surface. Conductive material 213 must extend longitudinally beyond the cover strip of the completed assembly so as to provide means to effectuate an electrical contact therewith. Conductive material 213 may be secured to base strip 211 by any suitable adhesive or alternatively may be embedded in the plastic composition simultaneously with the forming of the base strip.

Figure 20:
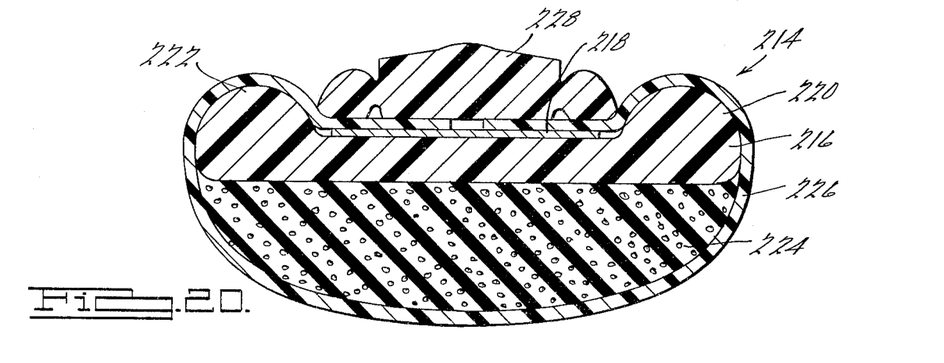
FIG. 20 is a transverse cross sectional view similar to those of FIGS. 17 through 19 showing a strap having an integrally formed adapter strip and base strip.

When the base strip is fabricated from a plastic material, it may be desirable to combine the adapter strip and base strip in a single integral piece. Such an embodiment of an integral base/adapter strip is illustrated in strap 214 of FIG. 20. Base/adapter strip 216 is identical in its outline shape to the assembly of base strip 211 and adapter strip 212 and similarly will have an electrically conductive member 218 disposed on its surface between a pair of parallel spaced apart shoulders 220 and 222. Shoulders 220 and 222 do not extend the entire length of base/adapter strip 216 but rather terminate a predetermined distance from either end thereof so as to allow for the mounting of the finished strap through the agency of brackets or the like as previously described. The addition of a cushion member 224, face strip 226, and trim strip 228 of like construction and applied in like manner as previously described completes the strap 214.

There is, thus, disclosed herein a new and unique form of strap construction which allows the economical manufacturing of a strong and durable strap which may be distinctively styled to accent an automobile interior as well as provide functional assistance to passengers therein. Further, the present invention provides a strap having a soft, plush, cushioned feeling to the touch of a user thereof while presenting a smooth, wrinkle-free aesthetically pleasing and distinctive appearance, both of which are particularly desirable for automobiles of the luxury class.

It is also apparent that the various embodiments of the present invention disclosed herein allow for extensive flexibility in the finished product, thus allowing the strap of the present invention to be easily adapted to a great variety of functional purposes as well as allowing the use of a multiplicity of materials to blend with or accent any desired decor.

While it will be apparent that the teachings herein are well calculated to teach one skilled in the art the method of making preferred embodiments of this invention, it will be appreciated that the invention is susceptible to modification, variation and change without departing from the proper scope of meaning of the subjoined claims.

What is claimed is:
1. A strap comprising:
an elongated base strip, said base strip having ends adapted for securing said strap to a surface;
cushioning means, said cushioning means being shorter than said base strip and imparting a soft, padded feeling to said strap;
a facing strip, said facing strip being wrapped around and retaining said base strip and said cushion strip in an engaging relationship, being of a length intermediate that of said base strip and said cushioning member, and having adjacent opposed longitudinal edges on one side of said base strip;
a trim strip disposed over and concealing said opposed longitudinal edges of said facing strip, secured to said facing strip and of a length approximately equal to said facing strip.

2. A strap as set forth in claim 1 wherein said base strip is of metal.

3. A strap as set forth in claim 2 further comprising:
a coating of a plastic resin material on said one side of said base strip;
said longitudinal edges of said facing strip, said trim strip, and said base strip are secured by dielectric heat fushion.

4. A strap in accordance with claim 3 wherein said trim strip is of metal and further comprises a coating of a plastic resin material on one side thereof, said side of said trim strip engaging said facing strip.

5. A strap as set forth in claim 1 wherein said base strip is of plastic material.

6. A strap as set forth in claim 1 wherein said cushioning means comprises a cushioning member formed of a resilient foam material and having a slot formed therein for receiving said base strip.

7. A strap as set forth in claim 1 wherein said cushioning means comprise:
an adapter strip having a groove disposed on one side thereof for receiving said base strip; and
a cushioning member formed of a resilient foam material engaging said adapter strip.

8. A strap comprising:
an elongated base strip having ends adapted for securing said strap to a surface;
an adapter strip engaging a side of said elongated base strip and having a length less than said base strip;
a cushion member engaging said adapter strip and of a length less than said adapter strip;
a facing strip surrounding and securing said base strip, adapter strip and cushioning member in an engaging relationship and of a length substantially coextensive with said adapter strip, said facing strip having opposed longitudinal edges meeting on one side of said base strip;
a trim strip disposed over and concealing said opposed longitudinal edges and having a length substantially equal to that of said facing strip; and
means for securing said facing strip and said trim strip in mutual engagement.

9. A strap as set forth in claim 8 wherein said adapter strip is formed of a solid but resiliently flexible material and further has a groove formed on said side engaging said base strip for receiving said base strip.

10. A strap in accordance with claim 9 wherein said adapter strip also has a pair of parallel spaced apart shoulder portions projecting above said groove and longitudinally coextensive with said adapter strip.

11. A strap in accordance with claim 8 wherein said adapter strip further comprises:

a pair of spaced apart, longitudinally extending shoulder portions;

a pair of relatively flat recessed portions extending inwardly from each of said shoulder portions;

said adapter strip having a slot formed therein below said flat recessed portions for receiving said adapter strip.

12. A strap in accordance with claim 11 wherein said trim strip is of a plastic resin material and said securing means comprises a dielectric heat fusion of said trim strip, said facing strip and said adapter strip.

13. A strap in accordance with claim 11 wherein said trim strip is of metal and further has a coating of plastic resin material on one side thereof, said side engaging said longitudinal edges of said facing strip and said securing means comprises a dielectric heat fusion of said trim strip, said facing strip and said adapter strip.

14. A strap in accordance with claim 11 wherein said pair of relatively flat recessed portions meet in an abutting relationship so as to afford access to said slot for inserting said base strip therein.

15. A strap in accordance with claim 8 wherein said cushion member is of a resilient foam material.

16. A strap in accordance with claim 8 wherein said adapter strip further comprises:

a pair of spaced apart longitudinally extending shoulder portions;

a relatively flat recessed surface extending between said shoulders;

said adapter having a slot formed therein below said flat recessed surface for receiving said base strip; and a pair of members extending inwardly below said slot so as to retain said base strip in said slot.

17. A strap in accordance with claim 16 wherein said inwardly extending members are in a spaced apart opposed relationship.

18. A strap comprising:

an elongated base strip having ends adapted for securing said strap to a surface;

a cushioning member surrounding the lateral edges and one side of said base strip and of a length less than said base strip;

a facing strip surrounding and securing said base strip and said cushion member in an engaging relationship and of a length intermediate that of said base strip and said cushion member;

said facing strip having opposed longitudinal edges meeting on one side of said base strip;

a trim strip disposed over and concealing said longitudinal edges and having a length substantially equal to that of said facing strip; and means securing said facing strip and said trim strip in mutual engagement.

19. A strap in accordance with claim 18 wherein said cushion member has a pair of longitudinally extending spaced apart shoulder portions extending along the lateral edges of said base strip and protruding above the side opposite said one side of said base strip.

20. A strap in accordance with claim 19 wherein said base strip is of metal.

21. A strap in accordance with claim 20 wherein said facing strip and said trim strip are of a dielectric heat fusible material and said base strip has a coating of a plastic resin material on said opposite side, said trim strip, said facing strip and said base strip being secured by dielectric heat fusion.

22. A strap in accordance with claim 21 wherein said trim strip is a thin strip of vinyl composition, said trim strip having a simulated stitching imprinted thereon by said dielectric heat fusion.

23. A strap in accordance with claim 20 wherein said trim strip is of metal, and further has a coating of a dielectric heat fusible material on one side thereof, said side engaging said longitudinal edges of said facing strip, said facing strip is of a dielectric heat fusible material and said base strip has a coating of a plastic resin material on one side thereof, said trim strip, facing strip and base strip being secured by dielectric heat fusion.

24. A strap comprising:

an elongated base strip having ends adapted for securing said strap to a surface and formed of a solid resilient and flexible plastic material;

an adapter strip engaging a side of said base strip and of a length less than said base strip;

said adapter strip having a pair of parallel spaced apart shoulder portions extending longitudinally from one side of said adapter strip and a longitudinal groove or slot for receiving said base strip;

a cushioning member engaging said adapter strip on a side opposite said shoulder portions;

a facing strip wrapped snugly around said base strip, adapter strip and cushioning member, the longitudinal edges meeting on a slightly spaced apart relationship between said shoulder portions;

a trim strip disposed between said shoulder portions so as to conceal said longitudinal edges;

said cushioning member being of a length shorter than said base strip;

said facing strip, adapter strip and trim strip all being of a substantially equal length intermediate that of said base strip and said cushion strip; and means for securing said trim strip, said facing strip and said base strip.

25. A strap in accordance with claim 24 wherein said trim strip is of a plastic resin composition.

26. A strap in accordance with claim 24 wherein said facing strip and said trim strip are of a dielectric heat fusible material and said base strip further comprises a coating of a heat fusible material and said securing means is a dielectric heat fusion.

27. A strap comprising:

an elongated base strip having ends adapted to secure said strap to a surface;

said base strip also having a pair of spaced apart parallel shoulder portions extending along the longitudinal edges of said base strip for a predetermined distance, said predetermined distance being less than the length of said base strip and projecting outward from one side of said base strip;

a cushioning member engaging the opposite side of said one side of said base strip;

a facing strip wrapped snugly around said base strip and said cushion strip, the longitudinal edges of said facing strip meeting in an abutting or slightly spaced apart relationship on said one side of said base strip and between said shoulder portions;

a trim strip disposed over and concealing said longitudinal edges of said facing strip;

said trim strip and said facing strip being of a length substantially coextensive with said shoulder portions and said cushion member being of a length less than said shoulder portions; and means for securing said trim strip, facing strip and said base strip in mutual engagement.

28. A strap in accordance with claim 27 wherein said base strip is of a plastic composition.

29. A strap in accordance with claim 28 wherein said trim strip has a simulated stitching imprinted thereon by said dielectric heat fusion.

* * * * *

UNITED STATES PATENT OFFICE
CERTIFICATE OF CORRECTION

Patent No. 3,977,054      Dated Aug. 31, 1976

Inventor(s) Ronald D. Moore, et al

It is certified that error appears in the above-identified patent and that said Letters Patent are hereby corrected as shown below:

The term of this patent subsequent to April 27, 1993, has been disclaimed.

Signed and Sealed this

Twelfth Day of October 1976

[SEAL]

Attest:

RUTH C. MASON
*Attesting Officer*

C. MARSHALL DANN
*Commissioner of Patents and Trademarks*